UNITED STATES PATENT OFFICE.

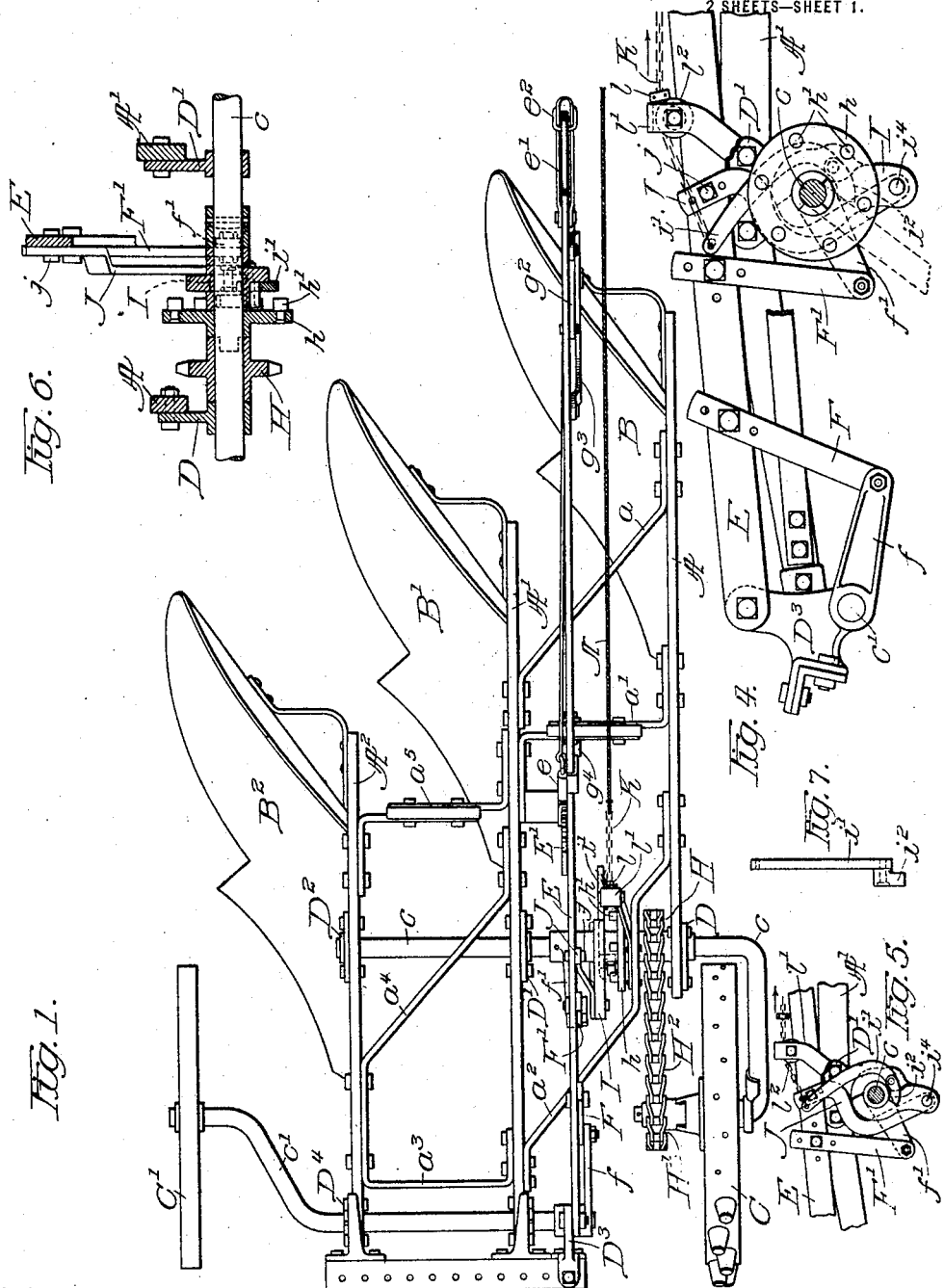

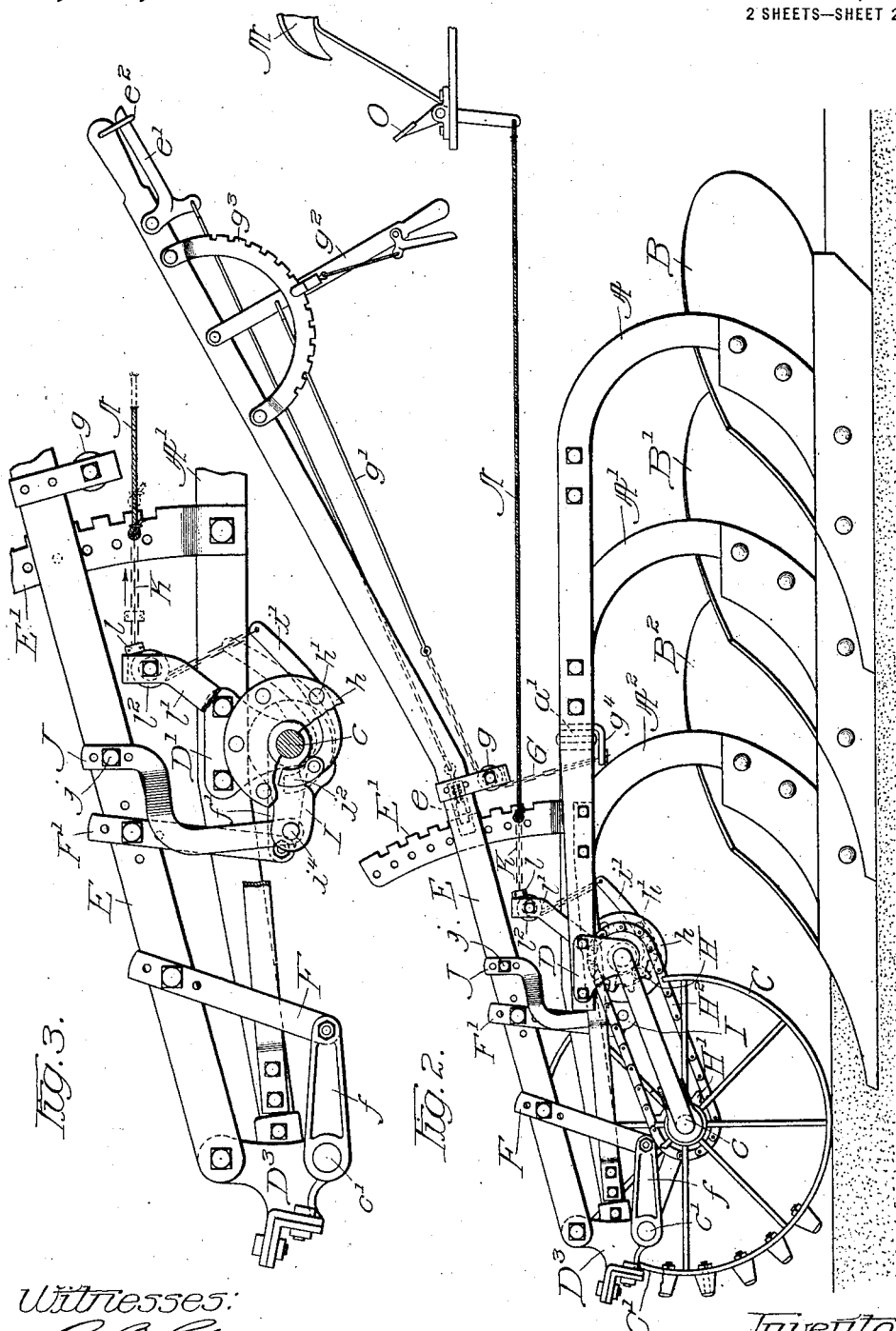

JOHN F. STEWARD, OF CHICAGO, ILLINOIS, ASSIGNOR, BY MESNE ASSIGNMENTS, TO FRED GERLACH AND ARNOLD B. KELLER, TRUSTEES, BOTH OF CHICAGO, ILLINOIS.

DEVICE FOR RAISING A GANG OF PLOWS.

1,388,978. Specification of Letters Patent. Patented Aug. 30, 1921.

Application filed February 13, 1914, Serial No. 818,458. Renewed April 14, 1919. Serial No. 290,089.

*To all whom it may concern:*

Be it known that I, JOHN F. STEWARD, a citizen of the United States, residing at Chicago, in the county of Cook and State of Illinois, have invented certain new and useful Improvements in Devices for Raising a Gang of Plows, of which the following is a full description, reference being had to the accompanying drawings, in which—

Figure 1 is a plan view of a gang of plows;

Fig. 2 is a side elevation of Fig. 1, showing the plows in the ground;

Fig. 3 is a detail showing the position of the lifting devices when the plows are in the furrow;

Fig. 4 shows details of substantially the same parts when the plows are lifted;

Fig. 5 shows a side elevation of some of the parts shown in Fig. 4;

Fig. 6 is a rear sectional elevation of the parts shown in Fig. 4; and

Fig. 7 is a detail of the lever mechanism.

In Figs. 1 and 2 I have shown a plow frame having three bodies, but the principles of the invention can be applied to gangs of two bodies, or to a single plow, as may be desired. When using a two or three gang plow it is not necessary to raise the plows successively, as to do so would add unnecessary complications. In plowing with tractors or traction engines it is usual to have at each end of the field a cross furrow to indicate where the plows should be raised. This true, a single cross furrow of the gang, in plowing the ends of the field, will be sufficient to put in shape the irregular raising of the two or three bottoms; in other words, the plowing of once across, at each end of the field, will avoid the necessity of complicated devices adapted to raise the plows successively.

In the drawings I show a main frame consisting of the beams A, $A^1$ and $A^2$, strutted between by the braces $a$, $a^1$, $a^2$, $a^3$, $a^4$ and $a^5$. Upon these beams are secured three shares and moldboards B, $B^1$ and $B^2$. The front of the plow is sustained by the wheels C and $C^1$, the latter adapted to run in the furrow previously plowed. These wheels are supported upon the cranked axles $c$ and $c^1$. The axle $c$ is supported in bearings D, $D^1$ and $D^2$ secured to the beams of the gangs. Each wheel is mounted on an arm $c$ and $c^1$, of ordinary form, but the arm $c$ I prefer to form as shown in Fig. 1; that is, with the bearing for the wheel directed furrow-ward. The axle $c^1$ is supported in brackets $D^3$ and $D^4$, preferably attached to the beams $A^1$ and $A^2$ at their forward ends. E is a lever pivoted to the bracket $D^3$. In this instance the lever is shown as having a quadrant $E^1$ and latch $e$ by which the plow may be held in any definite position when the automatic lifting mechanism is not in use. The latch $e$ is controlled by a thumb latch $e^1$, but the latter is held from action by the link $e^2$, when desired, as shown in Fig. 2. From the lever E extends a link F to the arm $f$, secured to the axle $c^1$ beneath the lever, as shown in Figs. 1 and 2. $F^1$ is a link, also pivoted to the lever and to the arm $f^1$, pinned to the rock shaft $c$, beneath the lever E. It will thus be seen that to move the lever E upward or downward will rock both of the axles $c$ and $c^1$, and hence carry the wheels downward or upward as the case may be, relative to the plow frame; or, stated otherwise, the wheels, running one in the furrow and the other on the land, will, by the action of rocking the axles, raise the plow frame and plows from the ground. The depth of the furrows may be controlled by the latch $e$ and quadrant $E^1$ by setting free the thumb latch $e^1$, but in ordinary work the depth of the furrow is controlled by the chain G, or equivalent means. Holes may be provided in the quadrant $E^1$ into which a bolt may be inserted to limit the upward movement of the lever, but I prefer the chain G for the following reasons: When the plows are raised from the ground, as in traveling over the field, it is only necessary to set free the devices which sustain them above the ground, when they will instantly drop and begin furrows. To the chain G, which passes over the sheave $g$, is secured a rod $g^1$ that engages a lever $g^2$ pivoted to the rear end of the main lever E. $g^3$ may be any form of quadrant secured to the lever E, or any mechanical means for shifting the position of the rod $g^1$ may be resorted to. Upon the lever $g^2$ is a detent and thumb latch of ordinary construction. If it is desired to increase the depth of the furrows the lever $g^2$ is moved forward, which produces slack in the chain G, hence the lever E will be permitted to move upward to a greater extent. If it is desired to plow a more shallow furrow, the lever $g^2$ is moved rearward, which not only forces the lever E downward, but sustains it in that position, the chain G being attached to a clip $g^4$ secured to the plow frame. The wheel $C^1$ is adapted to run in the last furrow previously plowed in order to regulate the depth of the furrow being formed by the plow $B^2$, but the connections of the cranked axle $C^1$ to the lever E are so proportioned that the wheel $C^1$ will move but little until the plows are above ground; the main object of adjusting the height of the wheel $C^1$ being merely to raise the plows above ground in turning and running over the road. The lever E may, for the moment, be considered merely preferable means for moving the wheel axles. It will be observed that the arm $f^1$ is moved by the link $F^1$ a greater part of a revolution than the arm $f$, as the wheel C must move upward so far as to permit of any depth of furrow required. This is accomplished by spacing the pivots along the lever E as may be desired.

Now, coming to the automatic action of lifting the entire gang: Referring first to Fig. 2, upon the axle $c$ is seen a sprocket wheel H, and clutched to the wheel C is a sprocket wheel $H^1$. Connecting these sprocket wheels is the chain $H^2$. Clutched to the sprocket wheel H is a disk $h$, having pins $h^1$ projecting furrow-ward from its face and arranged near the periphery of the disk. I is an arm, its hub freely supported on the axle $c$, where it extends transversely beneath the beams of the plows, and pivoted to the arm I is a lever $i^1$. As seen in Fig. 7, the lever $i^1$ is offset in such a manner that the portion $i^2$ will be engaged by any of the pins in the disk $h$, but the longer portion will not engage the pins. Pivotally connected to the arm I at $i^4$ is the link J, in turn pivoted at $j$ to the lever E.

Now, referring to Fig. 3, it will be seen that if the chain K is moved in the direction indicated by the arrow, the lever $i^1$ will be moved upward and, as shown by dotted lines, the short end of the lever will be thrown out far enough to be engaged by one of the pins in the disk $h$. As the wheel C is constantly rotating and, through the instrumentality of the chain and sprocket wheel H, the disk clutched to the latter is in constant rotation, the pull of the chain will cause the short end of the lever $i^2$ to engage one of the pins, as stated, and the arm I will thus be given a partial rotation, which true, the link J will pull the lever E downward and hence raise the plow gang. The arm I is adapted to rotate so far as to pass beneath the center of the axle $c$ and form a dead center lock therewith; in other words, pass so far that a line drawn from the pivot $j$ of the lever to the pivot $i^4$ of the arm I, will be in rear of the center of the bent axle $c$; passing the center, as does the pivot $i^4$, because of the curvature of the link J, the arm I will be held downward and the plows thus sustained above ground. The lever $i^1$ must not from necessity, be disengaged from the pin in contact while the plows are being raised. The longer arm $i^1$ will be moved in such a manner that it will reach the position shown in Fig. 4. Any form of stop to arrest its further movement and place it in the position shown in Fig. 4 may be provided, but I prefer to apply to the chain K a stop $l$ that will strike the arm $l^1$, having the pulley $l^2$ over which the chain passes.

Turning now to Figs. 4 and 5, the means for permitting the points of the shares to enter the ground will be understood. If a line be drawn from the center of the bolt $j$ to the center of the bolt $i^4$ it will be found that such line will lie slightly in rear of the center of the crank shaft C, and hence that the lever E cannot rise and let the plows fall by their own weight; that is, as the cranked axle cannot turn, the plow and its frame cannot fall, and the points of the shares thus permitted to enter the ground. But, as shown in Fig. 5, as the short end $i^2$ of the lever $i^1$ lies against the hub of the arm I, any pull on the chain K will cause the arm I to rock on the shaft C and permit the pin $i^4$ to move forward and the arm I be permitted to rise by moving on the shaft C. In accordance with this movement the lever E can rise under the weight of the plow frame and plows and thus control both rocking axles. The chain G being secured to the plow frame, as shown in Fig. 2, will permit the lever E to rise only a short distance and the plows be permitted to enter the ground but little. If the lever $g^2$ be moved forward, more slack will be provided in the chain and the plows will be permitted to go deeper.

It will be understood from the drawings and description that the pressure of the foot upon the pedal O will throw the short end of the lever $i^1$ into action and the plows be raised, as will be understood by reference to Fig. 3. The block $l$ is merely a stop to cause the element of the clutch having a partial rotation to be thrown out of action at the proper instant. In order that the instant to set free the clutch may be regulated, the block is made adjustable on the chain by loosening the pinch-bolts that clamp its parts to the chain. Any substitute may be used that will arrest the arm $i^1$ of the clutching device at the proper instant.

Now, referring to Fig. 5, it will be seen that if the chain be drawn, as indicated by the arrow, by pressure of the foot or otherwise, the plows will be permitted to drop. Thus, by a single connection with the clutching mechanism the operator may raise the plows and also permit them to drop.

Although I have chosen to mount my plow-frame on cranked axles, it is evident that other means for adjustably supporting the frame on the wheels may be resorted to, as shown in the art to which this invention belongs.

The rear of the plows may be supported by a wheel running in the furrow made by the last plow when traveling over the road, as in common practice; but in plowing I prefer to let the heels of the plows drag over the ground. My device is merely for the purpose of causing the plows to drop the points of the shares so that they may enter the ground, and to regulate their depths of entrance, and also to raise the points out of the ground at the ends of the lands being plowed. The letters O M merely represent the relative position of the operator when a tractor is used, the plows being suspended beneath and the large wheels of the tractor in front. They have nothing to do with the invention proper and may be ignored.

What I claim as my invention, and desire to secure by Letters Patent, is:

1. In a plow, the combination of a plow supporting frame, carrying wheels, crank axles connecting the frame and wheels, a lever for rocking said axles, coöperating clutch members, a link between one of said clutch members and lever, and means for throwing said member of the clutch out of engagement with the coöperating clutch member when the line through the pivots of the connecting link has passed the axis of movement of the clutch.

2. In a plow, the combination of a plow supporting frame, carrying wheels, rockable crank axles connecting the frame and wheels, a lever adapted to rock the axles, coöperating clutch members, a link between one of said clutch members and said lever, means for throwing the said member of the clutch out of engagement with its coöperating member when the line through the pivots of the link passes beyond the axis of movement of the clutch to attain a locked position, and means for causing a backward movement of said clutch element to break the link from its locked position and permit the plows to enter the ground.

3. In a plow, the combination of a plow supporting frame, carrying wheels, crank axles connecting the frame and wheels, a lever for rocking said axles, coöperating clutch members, a link connecting one of said clutch members and said lever, and means for throwing said member of the clutch out of engagement with the coöperating member after a predetermined movement of said clutch members.

4. In a gang plow, in combination, a frame, a plow supported thereby, rocking cranked axles pivoted thereto, and supporting wheels rotatable on said cranked axles, a rotatable clutch element on the pivoted portion of one of said axles and free to rotate thereon, a coöperating clutch element pivoted on said axle and adapted to remain idle until forced into action, a member operatively connected to said axles, means for driving the clutch to move said member to rock the axles, and means for throwing the coöperating element of the clutch into action, at will.

5. In a gang plow, in combination, a plow-frame, wheels for supporting the same, cranked axles between the frame and wheels, a lever and links for rocking the cranked axles, whereby the plow-frame may be raised, a clutch adapted to move said lever, and adjustable means for limiting the movement of said lever.

6. In a plow, the combination of a plow supporting frame, a carrying wheel, a crank axle connecting the frame and wheel, coöperating clutch members, means for engaging the clutch members to cause the plow frame to be raised, said means by reverse movement thereof releasing the frame permitting it to lower, and an operating means associated with said means so that pulls on said operating means in the same direction cause said means to alternately raise and release the plow frame.

7. In a plow, the combination of a plow supporting frame, a carrying wheel, a crank axle connecting the frame and wheel, coöperating clutch members, means for engaging the clutch members to cause the plow frame to be raised, said means by reverse movement thereof releasing the frame permitting it to lower, an operating means associated with said means so that pulls on said operating means in the same direction cause said means to alternately raise and release the plow frame, and means for locking in the raised position.

8. The combination of an implement frame, axles journaled on the frame and having cranked ends, supporting wheels on the cranks, means operated by one of the wheels for simultaneously swinging the cranks and retaining them at their limit of movement in one direction, including an upwardly directed link pivotally connected to one of the axles and to the frame, said link being curved to permit its connection with the axle to pass under it in one position of the cranks.

9. In a gang plow, the combination of a rigid frame, a plurality of plow bodies fixedly mounted on said frame, a supporting wheel adjustably mounted on said frame, and means positively driven by the rotation of said supporting wheel adapted to adjust said wheel vertically relative to the frame, comprising a rotatable member and a link connected thereto, said link constructed to coact with a relatively stationary part of the structure when said member and link move slightly beyond dead center relations and the supporting wheel is slightly beyond in its lowermost position.

10. In a gang plow, the combination of a rigid frame, a plurality of plow bodies fixedly mounted on said frame, a supporting wheel adjustably mounted on said frame, means positively driven by the rotation of said supporting wheel adapted to adjust said wheel vertically relative to the frame, comprising a rotatable member and a link adapted to stand slightly beyond dead center relations when the supporting wheel is held in its lowermost position, and a stop positioned to engage said link when the rotatable member and link pass slightly beyond dead center.

11. The combination of an implement frame, a pair of cranked axles journaled on the frame, supporting wheels on the cranks, an adjusting lever pivoted on the frame and having a link connection with each axle and wheel-actuated lift mechanism connected to the lever.

12. The combination of an implement frame, a pair of cranked axles journaled on the frame, supporting wheels on the cranks, an adjusting lever pivoted on the frame and having a link connection with each axle and wheel-actuated lift mechanism connected to the lever, including linkage that forms a dead center lock at the limit of rotation of the axles in one direction.

13. The combination of an implement frame, a pair of cranked axles journaled on the frame, supporting wheels on the cranks, a member mounted on the frame for movement in a vertical plane and connected with the axles for turning them, means connecting the frame and member for regulating the extent of their relative movement, wheel driven lift mechanism on one of the axles and means for moving said member by actuation of said mechanism.

14. The combination of an implement frame, parallel axles journaled on the frame and having depending cranks inclined forwardly and rearwardly respectively, supporting wheels on the cranks, means operated by one of the wheels for simultaneously rotating said axles in opposite directions to swing the cranks upwardly and downwardly, including means for automatically locking the axles at the limit of rotation in one direction.

15. The combination of an implement frame, parallel axles journaled on the frame and having cranked ends, supporting wheels on the cranks, means operated by one of the wheels for simultaneously rotating the axles to swing the cranks upwardly and downwardly, including a connection between one axle and the frame having pivots which form a dead-center lock and automatically retain the axles at their limit of rotation in one direction.

16. The combination of an implement frame, cranked axles journaled on the frame, supporting wheels on the cranks, a lever having one end pivoted on the frame to swing in a vertical plane, a fixed arm on each axle, a link connecting each arm with the lever at points differently spaced from the pivot of the lever, and wheel actuated lift mechanism connected to the lever.

17. The combination of a frame, a supporting wheel mounted thereon for vertical adjustment, a member pivoted on the frame, and wheel adjusting connections between the member and wheel including journaled elements actuated by rotation of the wheel having pivots which pass slightly beyond dead-center and become locked by contact of one of said elements with a fixed part of the frame when the wheel is lowered.

18. The combination of a frame, a supporting wheel mounted thereon for vertical adjustment, a member pivoted on the frame, wheel adjusting connections between the member and wheel, including journaled elements actuated by rotation of the wheel having pivots which pass slightly beyond dead-center and become locked by contact of one of said elements with a fixed part of the frame when the wheel is lowered, and means for moving said elements out of locked position to raise the wheel.

19. The combination of a frame, a vertically movable supporting wheel having an axle mounted on the frame, a wheel adjusting lever mounted on the frame and connected to the axle, an arm rotatable on the axle and a link pivotally connecting the arm and lever, its pivot with the arm forming a dead-center lock with the axle in one adjustment of the wheel.

20. The combination of a frame, a vertically movable supporting wheel having an axle mounted on the frame, a wheel adjusting lever mounted on the frame and connected to the axle, an arm rotatable on the axle and a curved link connected to the lever and pivoted to the arm, the axle being received within the curve of the link and its pivot with the arm passing beneath the axle to form a dead-center lock in one adjustment of the wheel.

JOHN F. STEWARD.

Witnesses:
O. B. PETERSON,
D. E. LOCKERT.